(12) United States Patent
Arndt

(10) Patent No.: US 7,234,392 B1
(45) Date of Patent: Jun. 26, 2007

(54) OPEN FLAME ROTISSERIE UTENSIL HAVING SPIRAL WIENER RECEPTACLE

(76) Inventor: Darren John Arndt, P.O. Box 572, Viking, Alberta (CA) T0B 4N0

( * ) Notice: Subject to any disclaimer, the term of this patent is extended or adjusted under 35 U.S.C. 154(b) by 789 days.

(21) Appl. No.: 10/396,243

(22) Filed: Mar. 26, 2003

(51) Int. Cl.
*A47J 37/04* (2006.01)
(52) U.S. Cl. .......................... 99/441; 99/419; 99/421 A
(58) Field of Classification Search .................. 99/441, 99/421 A, 419
See application file for complete search history.

(56) References Cited

U.S. PATENT DOCUMENTS 2,136,658 A * 11/1938 Harry et al. .................. 99/427
3,742,840 A * 7/1973 Cogswell .................. 99/421 A
4,539,751 A * 9/1985 Chan .......................... 30/322
5,355,778 A * 10/1994 Mayfield et al. .............. 99/441
5,628,244 A * 5/1997 Holliday .................. 99/421 A \* cited by examiner

*Primary Examiner*—Reginald L. Alexander
(74) *Attorney, Agent, or Firm*—G F. Gallinger

(57) ABSTRACT

An open fire cooking utensil which has a simple and effective detachable skewless wiener holding end portion. The simplicity of the design makes it rugged, and easy to clean. The rotisserie utensil for roasting food comprises: a handle portion; an elongate shaft having one end attached to the handle portion and an other opposite end; and, a spiral food receptacle made from a spiralling member and having a cylindrical interior opening therein, said spiral food receptacle carried by the other opposite end of the elongate shaft. After food is roasted in, and removed from the interior opening, the spiralling member can be readily wiped clean. In a preferred embodiment of the invention the spiralling member and the elongate shaft comprise stainless steel tube.

10 Claims, 1 Drawing Sheet

OPEN FLAME ROTISSERIE UTENSIL HAVING SPIRAL WIENER RECEPTACLE

FIELD OF THE INVENTION

This invention relates to open fire cooking utensils. More particularly this invention relates to a multipurpose rotisserie utensil which has a simple and effective detachable skewless wiener holding end portion. The simplicity of the design makes it rugged, and easy to clean.

BACKGROUND OF THE INVENTION

Available open fire cooking utensils typically utilize prongs to hold food to be roasted. Most typically that food is a wiener. One of the problems with a multi pronged utensil is that if only one wiener is roasted then either the utensil is unbalanced for rotation, or if the wiener is skewered by more than one prong, rather than axially on a single prong, then it is not cooked evenly—its end portions are closer to the flame. Another problem inherent with a prong is either the difficulty of removing the hot cooked food therefrom, or alternatively the problem with inadvertent loss of the expanding wiener during roasting.

In U.S. Pat. No. 5,355,778 A. B. Mayfield disclosed the use of a cylindrical receptacle to contain foods roasted over fire. One of the problems with his solution to prongs was the difficulty of adequately securing the expanded metal which forms the cylinder to the elongate handle. The cylinder tends to bend, break, and detach from the elongate handle. Another problem with his cylindrical receptacle is cleaning. After an initial use the interior side of the expanded metal is coated with carbon and grease. Properly scrubbing to remove all of the grease from the large interior surface area is next to impossible.

A food containment means which is rugged and easy to clean is needed. There should be a minimal interior surface area which is smooth and readily accessible so that it can be easily wiped clean.

OBJECTS OF THE INVENTION

It is an object of this invention to disclose a hand held cooking utensil which can hold a wiener without using a skewer. It is an object of this invention to disclose a skewerless cooking utensil which can hold either one or two wideners in general axial alignment with the elongate handle whether one, or two are cooked concurrently, the whole wiener is roasted with consistent spacing from an open flame, and the utensil is balanced so that it can stop and remain stationary to cook any side of the food. It is yet a further object of this invention to disclose a simple and rugged utensil. A utensil having a simplicity which allows it to be inexpensively made. And a tool whose simplicity allows its interior side portion to be readily wiped clean.

One aspect of this invention provides for a rotisserie utensil for roasting food comprising: a handle portion; an elongate shaft having one end attached to the handle portion and an other opposite end; and, a spiral food receptacle made from a spiralling member and having a cylindrical interior opening therein, said spiral food receptacle carried by the other opposite end of the elongate shaft. After food is roasted in, and removed from the interior opening, the spiralling member can be readily wiped clean.

In a preferred aspect of the rotisserie utensil the interior opening has sufficient length to axially accommodate two wideners in tandem therein, so both when a single wiener is cooked, and when two wideners are cooked together therein, each wiener is generally uniformly spaced, and consequently consistently is cooked therealong.

Various other objects, advantages and features of this invention will become apparent to those skilled in the art from the following description in conjunction with the accompanying drawings.

FIGURES OF THE INVENTION

Figure 1:
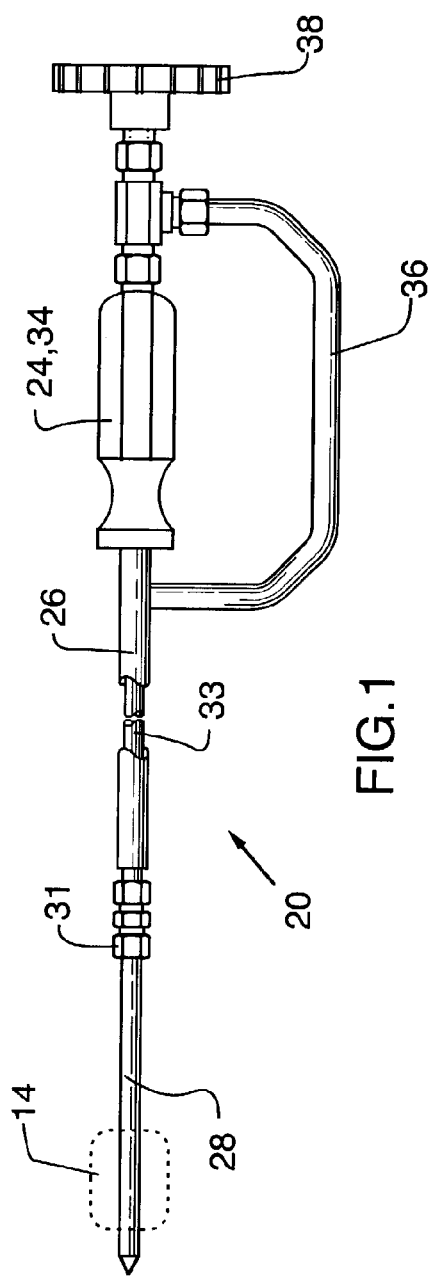
FIG. 1 is an elevational view of a rotisserie utensil fitted with a skewer end portion.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Figure 2:
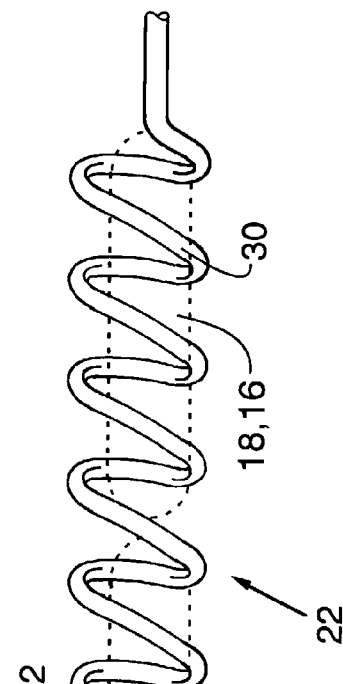
FIG. 2 is a perspective view of a detached food receptacle holding wideners therein. The food receptacle can be interchanged with the food skewer shown in FIG. 1.

Turning now to the drawings and more particularly to FIG. 1 we have a perspective view of an elevational view of a rotisserie utensil 20 fitted with a food skewer 28. FIG. 2 is a perspective view of a detached food receptacle 22 holding wieners 16 therein. The food receptacle 22 can be interchanged with the food skewer 28 shown in FIG. 1. The food skewer 28 is best for roasting most foods and is shown holding a marshmallow 14. The rotisserie utensil 20 for roasting food 18 comprises: a handle portion 24; an elongate shaft 26 having one end attached to the handle portion 24 and an other opposite end. A food receptacle 22 is made from a spiralling member 30, has an interior opening 32 therein. The spiral food receptacle 22 is carried by the other opposite end of the elongate shaft 26. After food 18 is roasted in, and removed from the interior opening 32, the spiralling member 30 can be readily wiped clean.

Most preferably the interior opening 32 within the spiralling member 30 is cylindrical. It is contemplated that the cylindrical opening 32 might be sized sufficiently large to accommodate and roast a corn cob (not shown), however; an interior opening 32, as shown in FIG. 2, sized to loosely accommodate a wiener 16 has more widespread application. In the most preferred embodiment of the invention the interior opening 32 has sufficient length to axially accommodate two wideners 16 in tandem therein, so both when a single wiener 16 is cooked, and when two wideners 16 are cooked together therein, each wiener 16 is generally uniformly spaced from a flame (not shown), and consequently is consistently cooked therealong.

In a preferred embodiment of the invention the spiral food receptacle 22 is removably carried by the other end of the elongate shaft 26, and the rotisserie utensil 20 further comprises a skewer 28 which can be alternatively carried by the other end of the elongate shaft 26.

In the most preferred embodiment of the invention the elongate shaft 26 comprises a tube, and the rotisserie utensil 20 further comprises an elongate interior tubing core 33 rotatably positioned within the elongate tubing shaft 26, said elongate tubing core 33 having a wheel 38 axially mounted and attached to one end thereof, and one of the spiral food receptacle 22 and the skewer 28 removably attached to the other opposite end thereof. When the handle portion 24 attached to the elongate shaft 26 is held stationary, the wheel 38 may be turned rotating the elongate tubing core 33 and one of the spiral food receptacle 22 and the skewer 28.

The inventor has found that a ⅜" stainless steel tube is an optimum size for the elongate shaft 26 and the handle portion 24. The elongate tubing core 33, the spiral food receptacle 22, and the skewer 28 comprise ¼" stainless steel tubing. The skewer 28 may alternatively comprise a disposable wood dowel. The elongate tubing core 33 is coupled to the spiral food receptacle 22, and the skewer 28 with a ¼" tubing coupling 31. Stainless steel tubing is lightweight, rugged, and easily wiped clean after being exposed to intense heat. The cooking utensil 20 has an overall length of almost 4', excluding the length of the spiral food receptacle 22 which is almost 1' long, or alternatively the skewer 28, which is generally 4" long.

In the most preferred embodiment of the invention the handle portion 24 comprises an insulating elongate member 34 which fits closely over the metallic shaft portion 26. A handle encircling member 36 is used to facilitate holding onto, and hanging up the rotisserie utensil 20.

Figure 3:
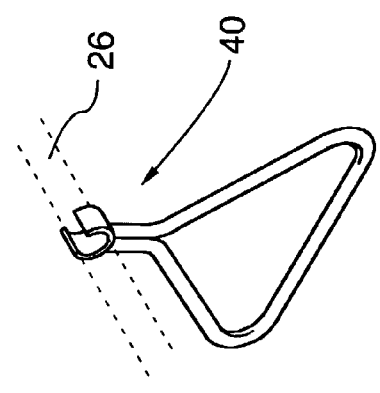
FIG. 3 is a perspective view of an elongate shaft support which snaps around and under an elongate shaft of the rotisserie utensil.

FIG. 3 is a perspective view of an elongate shaft support 40 which snaps around and under the elongate shaft 26 of the rotisserie utensil 20. When the rotisserie utensil 20 is rotatably supported on the stand 40 it may be rotated by turning the wheel 38 to evenly cook food 18 therearound. In a preferred embodiment the stand 40 loosely snaps on and over the elongate shaft 26, so once engaged the stand 40 is maintained in an upright position beneath the elongate shaft 26. Most preferably the stand 40 comprises ⅜" stainless steel tubing.

While the invention has been described with preferred specific embodiments thereof, it will be understood that this description is intended to illustrate and not to limit the scope of the invention, which is defined by the following claims.

I claim:

1. A rotisserie utensil for roasting food comprising:
   a handle portion;
   an elongate shaft having one end attached to the handle portion and an other opposite end; and,
   a spiral food receptacle made from a spiralling member and having an interior opening therein, said spiral food receptacle carried by the other opposite end of the elongate shaft;
   further comprising removable connecting means positioned between the spiral food receptacle and the other end of the elongate shaft, and wherein the rotisserie utensil further comprises a skewer which can alternatively replace the spiral food receptacle and be carried by the opposite end of the elongate shaft by the connecting means;
   so that the rotisserie utensil may best accommodate different types of food and the end portion contacting the food can be removed to facilitate cleaning.

2. A rotisserie utensil as in claim 1 wherein the interior opening within the spiralling member is cylindrical.

3. A rotisserie utensil as in claim 2 wherein the interior opening is sized to loosely accommodate a wiener.

4. A rotisserie utensil as in claim 3 wherein the interior opening has sufficient length to axially accommodate two wideners in tandem therein, so both when a single wiener is cooked, and when two wideners are cooked together therein, each wiener is generally uniformly spaced, and consequently consistently is cooked therealong.

5. A rotisserie utensil as in claim 4 wherein the elongate shaft comprises a tube, and wherein the rotisserie utensil further comprises an elongate interior tubing core rotatably positioned within the elongate tubing shaft, said elongate tubing core having a wheel axially mounted and attached to one end thereof, and one of the spiral food receptacle and the skewer removably coupled to the other opposite end thereof; so that when the handle portion attached to the elongate shaft is held stationary, the wheel may be turned rotating the elongate tubing core and one of the spiral food receptacle and the skewer.

6. A rotisserie utensil as in claim 5 wherein the elongate shaft and the handle portion comprise ⅜" metallic tubing and wherein the elongate tubing core, the spiral food receptacle and the skewer comprise ¼" metallic tube.

7. A rotisserie utensil as in claim 6 the handle portion further comprises an insulating elongate member which fits closely on the elongate shaft.

8. A rotisserie utensil as in claim 5 further comprising a handle encircling member to facilitate holding onto, and hanging up, the rotisserie utensil.

9. A rotisserie utensil as in claim 8 further comprising a shaft support stand to support the elongate shaft for extended time periods.

10. A rotisserie utensil as in claim 9 wherein the stand loosely snaps on and over the elongate shaft, so once engaged the stand is maintained in an upright position beneath the elongate shaft.

* * * * *